United States Patent
Lee (10) Patent No.: US 6,477,772 B2
(45) Date of Patent: Nov. 12, 2002

(54) METHOD FOR MOUNTING LOAD SENSING PROPORTIONING VALVE ASSEMBLY OF AUTOMOBILE

(75) Inventor: Sang-Hoon Lee, Ulsan (KR)

(73) Assignee: Hyundai Motor Co., Seoul (KR)

( * ) Notice: Subject to any disclaimer, the term of this patent is extended or adjusted under 35 U.S.C. 154(b) by 0 days.

(21) Appl. No.: 09/739,805

(22) Filed: Dec. 20, 2000

(65) Prior Publication Data

US 2001/0039714 A1 Nov. 15, 2001

(30) Foreign Application Priority Data

May 12, 2000 (KR) .......................... 2000-25346

(51) Int. Cl.$^7$ .............................................. B23P 15/00
(52) U.S. Cl. ................. 29/888.01; 29/897.2; 29/525.11
(58) Field of Search ............................ 29/888.01, 423, 29/428, 897.2, 525.11, 525.01; 303/22.2, 22.7; 188/195; 73/146

(56) References Cited

U.S. PATENT DOCUMENTS

| | | | |
|---|---|---|---|
| 6,032,360 A | * | 3/2000 | Bornhorst et al. ............ 29/6.01 |
| 6,217,130 B1 | * | 4/2001 | Engle .......................... 188/195 |
| 6,305,756 B1 | * | 10/2001 | Scott et al. .................. 188/195 |
| 2001/0039714 A1 | * | 11/2001 | Lee ........................... 29/525.11 |
| 2001/0054841 A1 | * | 12/2001 | Ross et al. ..................... 303/20 |

\* cited by examiner

*Primary Examiner*—I. Cuda-Rosenbaum
(74) *Attorney, Agent, or Firm*—Birch, Stewart, Kolasch & Birch, LLP (57) ABSTRACT

A method for mounting a load sensing proportion valve assembly of an automobile includes the steps of securing the crank member of the assembly to a side of a rotating shaft, which rotatably attaches the crank member to the proportioning valve of the assembly, using a first connecting member having a first rotating direction. Thereafter, a rod, which is connected to the rear axle housing of the automobile, is connected to the crank member through a slit formed in the crank member using a second connecting member having a second rotating direction. Finally, the first connecting member is removed so as to allow the crank member to be rotated.

4 Claims, 7 Drawing Sheets

(prior art)

FIG. 8

(prior art)

FIG. 9

(prior art)

FIG. 10

(prior art)

METHOD FOR MOUNTING LOAD SENSING PROPORTIONING VALVE ASSEMBLY OF AUTOMOBILE

BACKGROUND OF THE INVENTION

1. Field of the Invention

The present invention relates generally to a method for mounting a load sensing proportioning valve assembly of an automobile, and particularly to a method for mounting a load sensing proportioning valve assembly of an automobile, which is capable of stabilizing the braking operation of the automobile by preventing a variation in the normal length of its elastic member and thus preventing imbalanced braking due to the early locking of the rear wheel side of the automobile regardless of a variation in load.

2. Description of the Prior Art

In general, a load sensing proportioning valve of an automobile is a valve that is capable of balancing the braking forces for front and rear wheels regardless of a variation in load.

The load sensing proportioning valve increases the oil pressure of the wheel cylinder of a rear wheel during braking in such a way that a lever is mounted to a plate spring between a master cylinder and the wheel cylinder of the rear wheel to sense the weight of an automobile.

Figure 7:
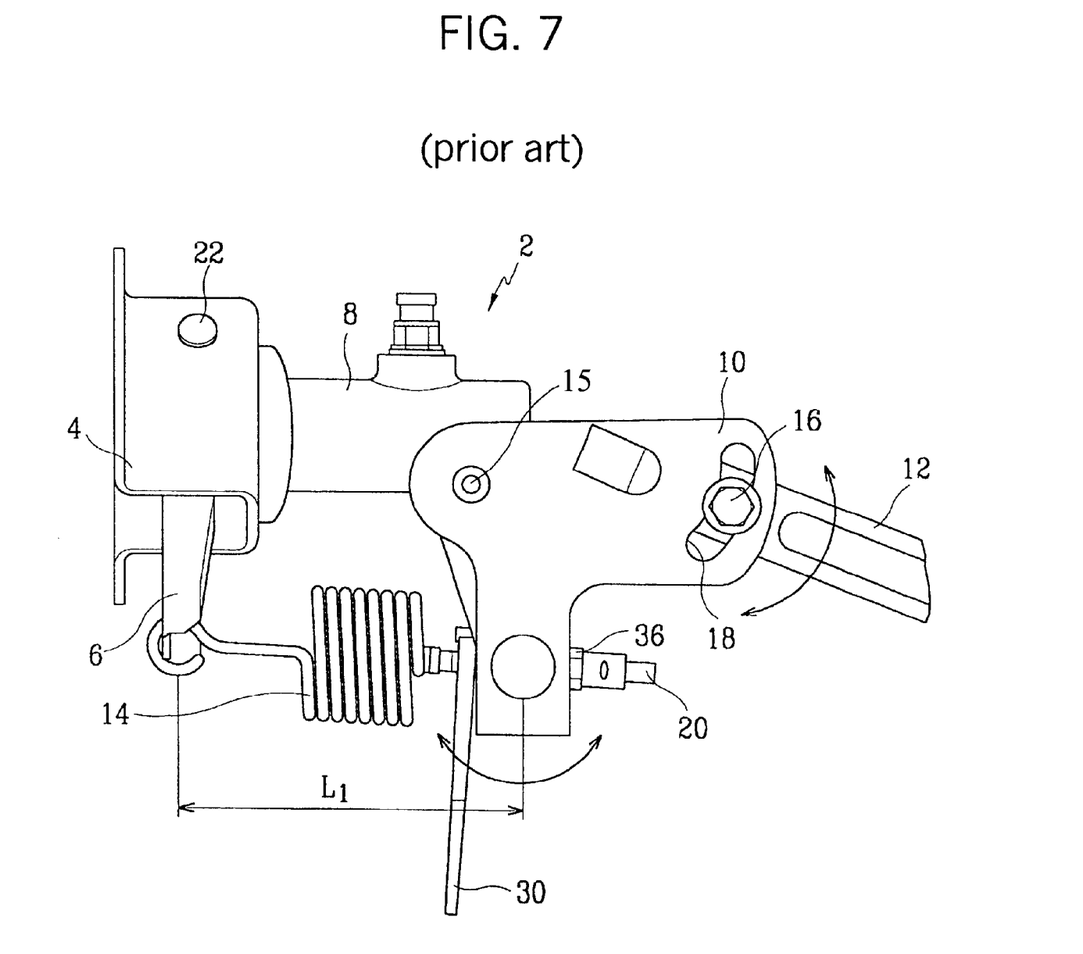
FIG. 7 is a side view of a conventional load sensing proportioning valve assembly.

FIG. 7 is a side view of a conventional load sensing proportioning valve assembly.

Figure 8:
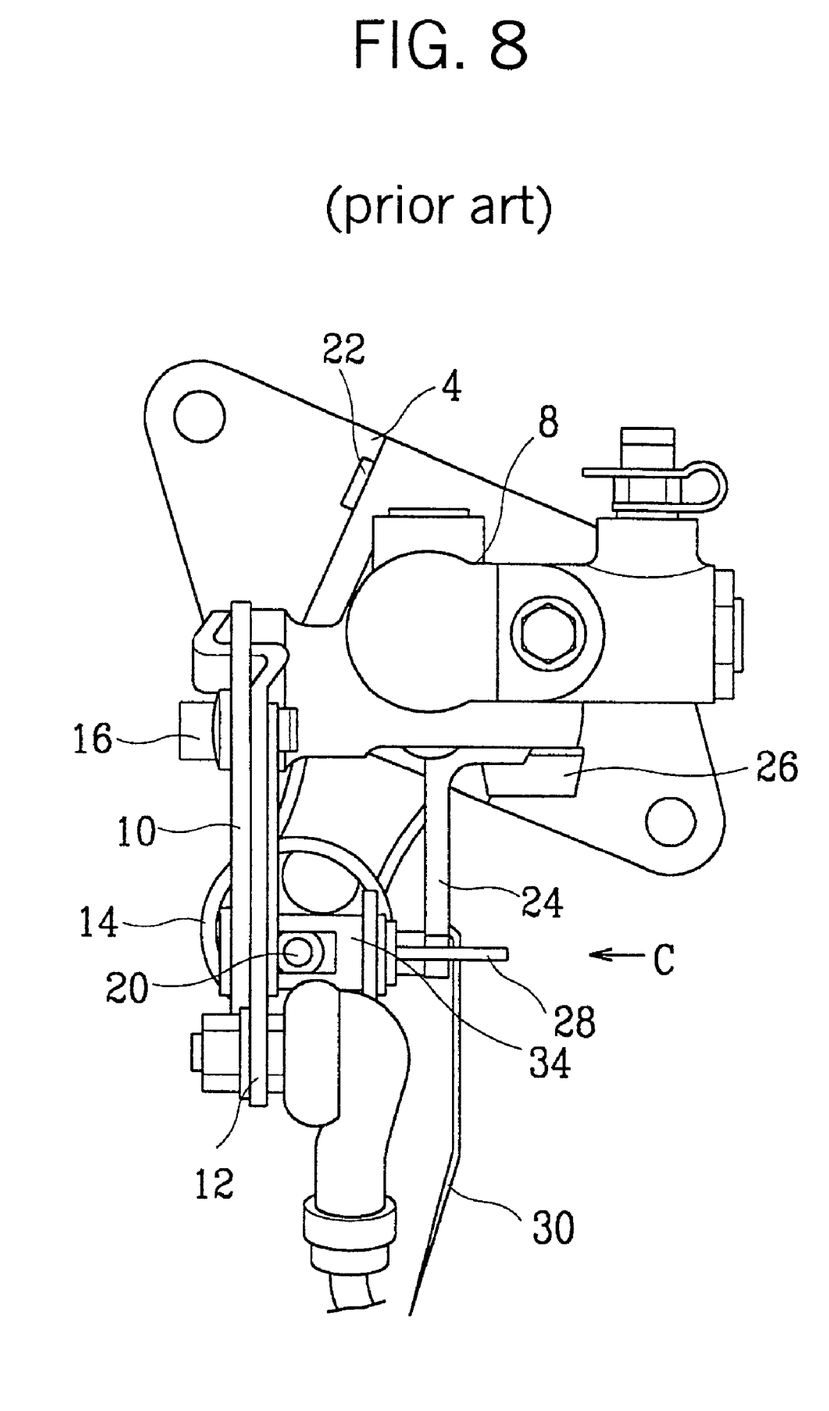
FIG. 8 is a front view of a conventional load sensing proportioning valve assembly.
Figure 9:
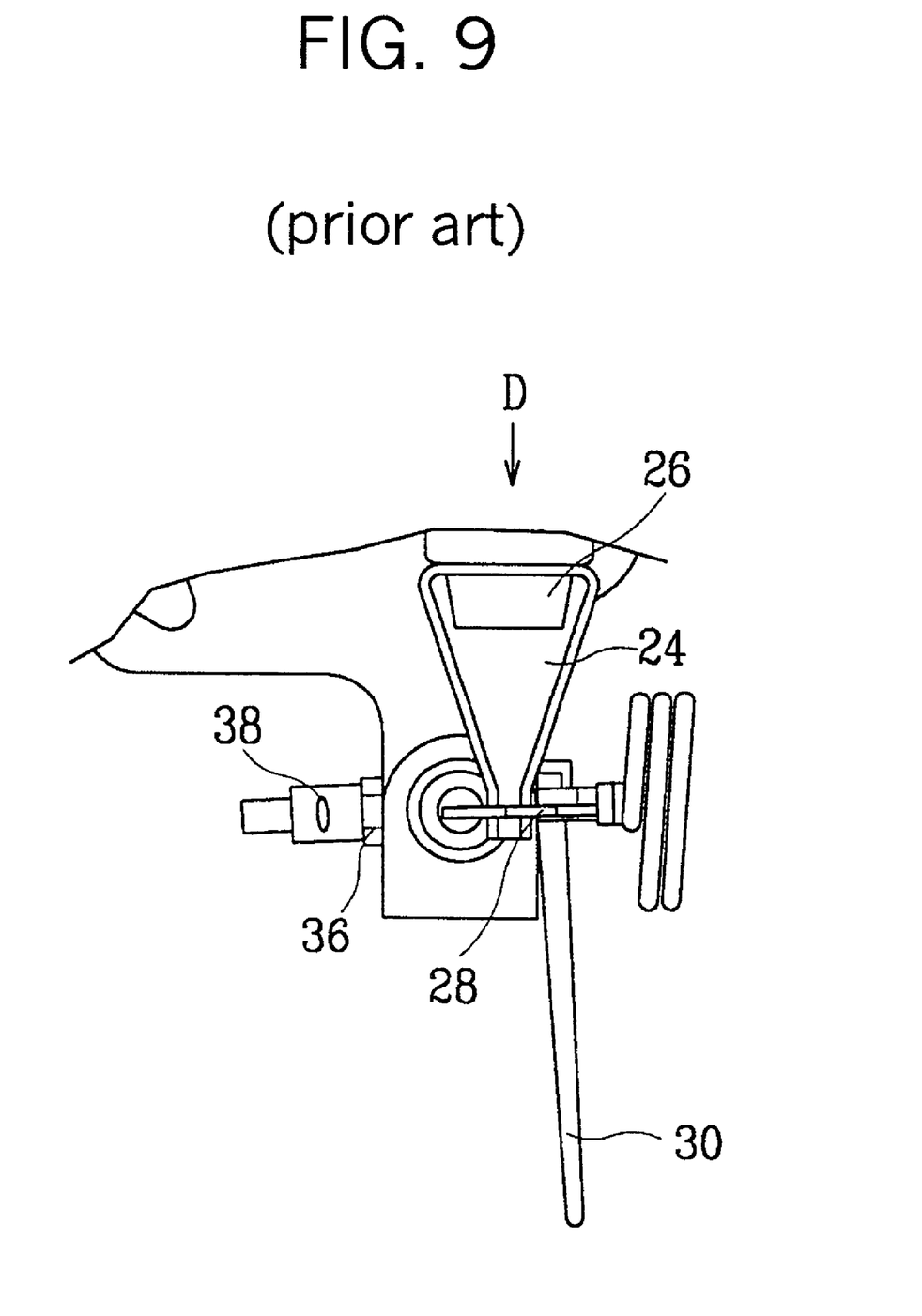
FIG. 9 is a view showing the conventional load sensing proportioning valve assembly of FIG. 8 seen in "C" direction.
Figure 10:
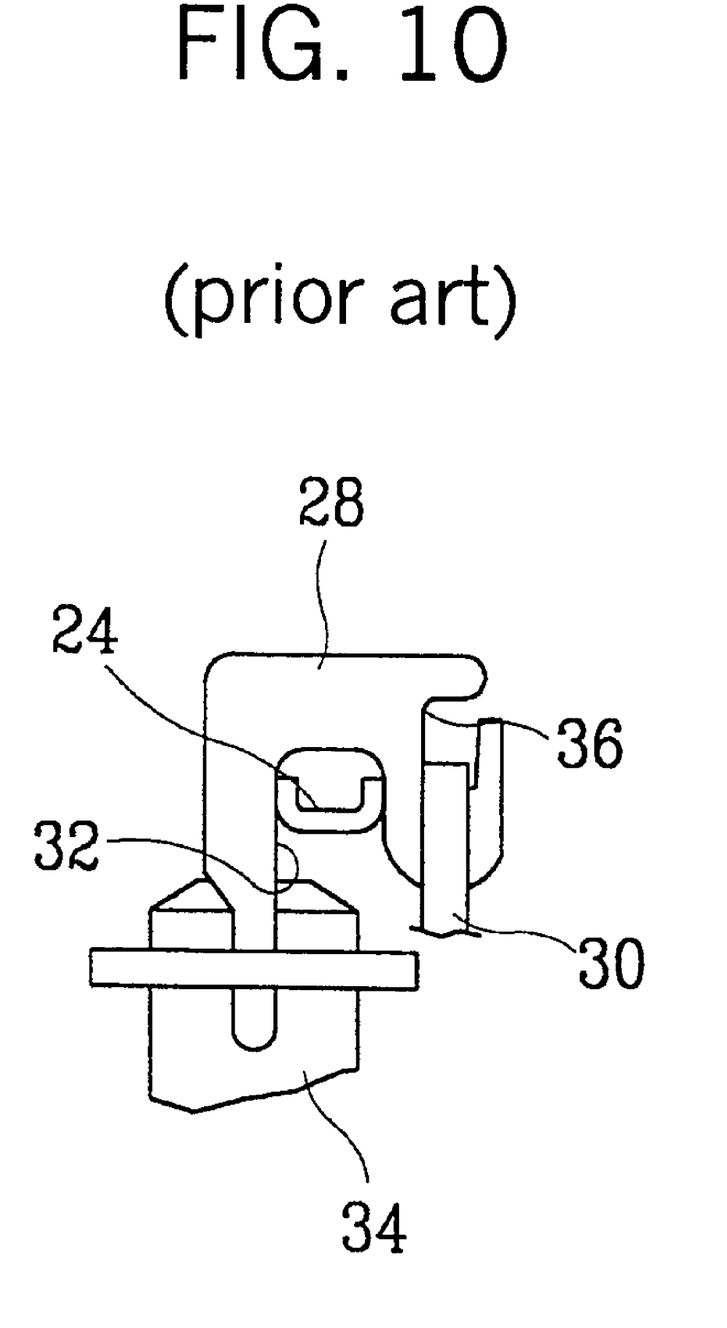
FIG. 10 is a view showing the conventional load sensing proportioning valve assembly of FIG. 7 seen in "D" direction.

FIG. 8 is a front view of a conventional load sensing proportioning valve assembly. FIG. 9 is a view showing the conventional load sensing proportioning valve assembly of FIG. 8 seen in "C" direction. FIG. 10 is a view showing the conventional load sensing proportioning valve assembly of FIG. 7 seen in "D" direction.

The load sensing proportioning valve assembly 2 comprises a bracket 4, a load bracket lever 6, a proportioning valve 8, a crank member 10, a rod 12 and an elastic member 14.

The bracket 4 is mounted to a rear chassis frame (not shown). The proportioning-valve 8 is mounted to the bracket 4 to be projected from the bracket 4. The load bracket lever 6 is mounted to a portion of the bracket 4.

The proportioning valve 8 is adapted to control the supply of oil to a rear side by the action of a stem (not shown) that is pushed by the load bracket lever 6.

The crank member 10 is rotatably mounted to the proportioning valve 8 by means of a rotating shaft 15. The crank member 10 is L-shaped, and is connected to the load bracket lever 6 by the elastic member 14. The crank member 10 is provided with a curved slit 18 into which a bolt 16 is inserted to secure the rod 12 to the crank member 10.

The rod 12 connects a rear axle housing (not shown) and the crank member 10 so as to transmit a variation in the load of a deck to the crank member 10.

In the load sensing proportioning valve assembly constructed as described above, when a load is applied to the deck of a commercial vehicle due to freight loading, the crank member 10 is rotated around the rotating shaft 15 counterclockwise by the rod 12 connected to the rear axle housing.

When the crank member 10 is rotated counterclockwise, the elastic member 14 connected to the crank member 10 by a support rod 20 pulls the load bracket lever 6 while being extended.

Accordingly, the load bracket lever 6 is rotated around a hinge 22 and pushes the stem in the proportioning valve 8, so that the pressure of brake oil supplied to the rear side is increased, thereby stabilizing a braking operation and preventing an imbalanced braking operation.

When the load having been applied to the deck is removed, a reversed operation is performed to allow the reduced pressure of brake oil to be applied to the rear side of the automobile.

In the meantime, in order to stabilize the braking operation without imbalance, the load sensing valve assembly should be precisely assembled.

To this end, the load sensing valve assembly is assembled using a mounting bracket 24, a bolt 26, a mounting pin 28, and a band 30. In particular, the load sensing valve assembly should be assembled without a variation in the elastic force of the elastic member 14.

First step: the mounting bracket 24 in the form of a reversed triangle is attached to a portion of the crank member 10 while being erected.

Second step: the lower end of the mounting bracket 24 is inserted into a slit 32 provided in the mounting pin 28.

Third step: the mounting pin 28 is inserted into the holder shaft 34 mounted to the crank member 10 while the lower end of the mounting bracket 24 is inserted into a slit 32 provided in the mounting pin 28, and the band 30 is fitted into a fitting groove 36.

Fourth step: after the rod 12 is mounted to the rear axle housing, the rod 12 is rotatably connected to the crank member 10 using the bolt 16 and the slit 18 in the crank member 10.

Fifth step: the band 30 is cut.

Sixth step: assembly is finished by removing the mounting pin 28 from the older shaft 34.

However, in the assembly of the conventional load sensing proportioning valve, there is a possibility in which the normal length L1 of the elastic member 14 is changed when the rod 12 is connected to the crank member 10 using the bolt 16.

Additionally, when the connecting bolt is fastened, the normal length L1 of the elastic member 14 can be varied due to the gap between the mounting pin 28 and the mounting bracket 24 and the deformation of the band 30, thereby deteriorating the performance of a braking operation.

Accordingly, the variation in the normal length of the elastic member causes the pressure of braking oil to be excessively increased, so that the early braking of the rear wheel side of the automobile is created, thereby generating the imbalanced braking operation of the automobile.

The number of parts to mount the load sensing proportioning valve assembly is excessively large, so that there occur shortcomings in which the mounting procedure of the assembly is complicated, the efficiency of the mounting of the assembly is reduced, and the mounting cost of the assembly is expensive.

SUMMARY OF THE INVENTION

Accordingly, the present invention has been made keeping in mind the above problems occurring in the prior art, and an object of the present invention is to provide a method for mounting a load sensing proportioning valve assembly of an automobile, which is capable of stabilizing the braking operation of the automobile by preventing a variation in the normal length of its elastic member and thus preventing imbalanced braking due to the early locking of the rear wheel side of the automobile regardless of a variation in load.

In order to accomplish the above object, the present invention provides a method for mounting a load sensing proportioning valve assembly of an automobile, comprising the steps of: securing the crank member of the assembly to a side of a rotating shaft, which rotatably attaches the crank member to the proportioning valve of the assembly, using a first connecting member having a first rotating direction; connecting a rod, which is connected to the rear axle housing of the automobile, to the crank member through a slit formed in the crank member using a second connecting member having a second rotating direction; and removing the first connecting member so as to allow the crank member to be rotated.

The first connecting member may be a left-handed bolt.

The second connecting member may be a right-handed bolt.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 1:
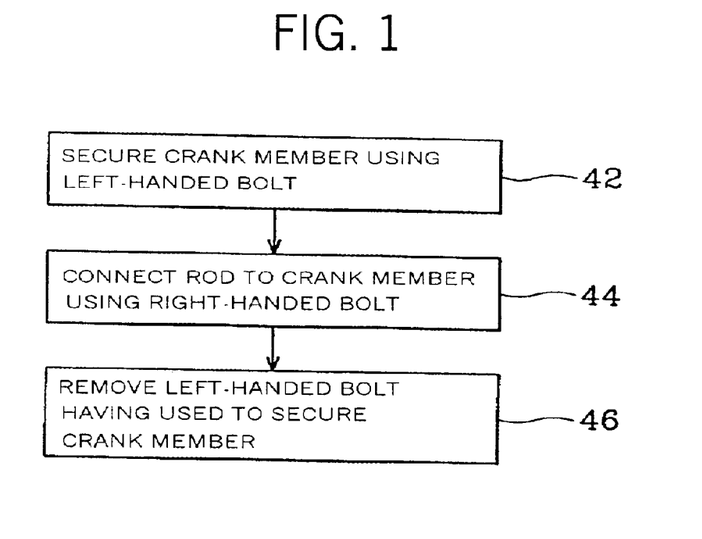
FIG. 1 is a flowchart of a method for mounting a load sensing proportioning valve assembly in accordance with the present invention.
Figure 2:
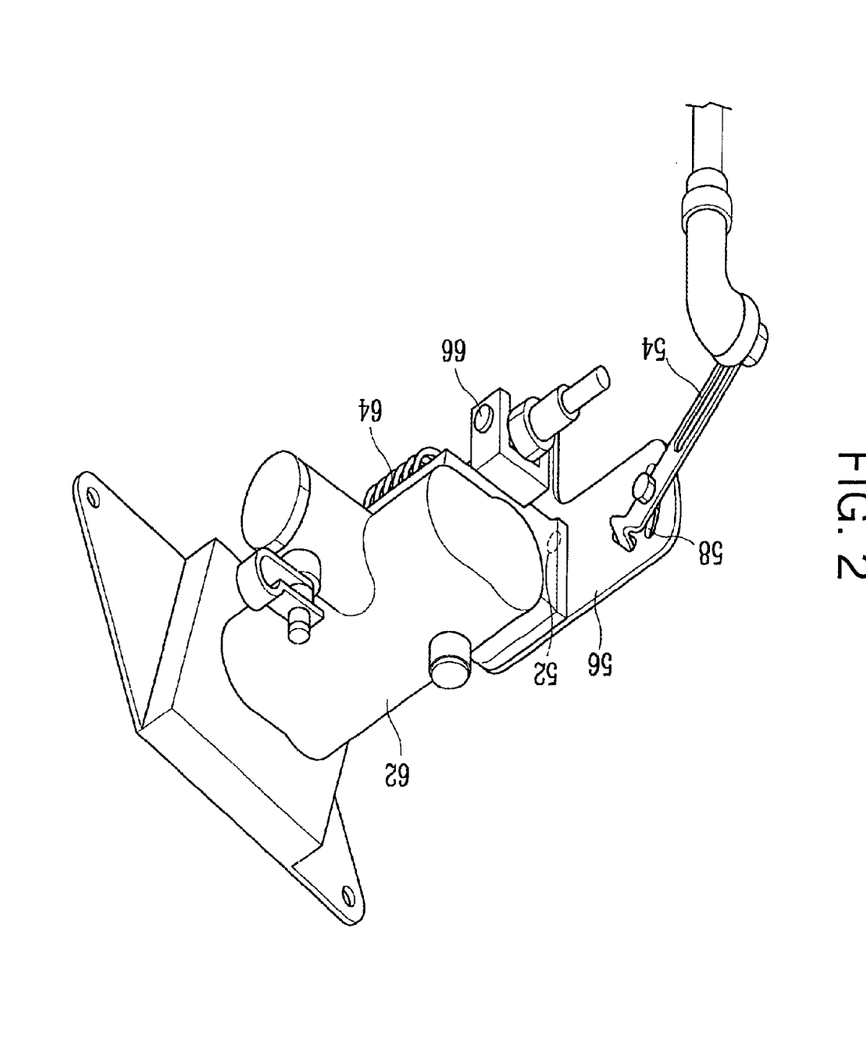
FIG. 2 is a perspective view of a load sensing proportioning valve assembly in accordance with a preferred embodiment of the present invention.
Figure 3:
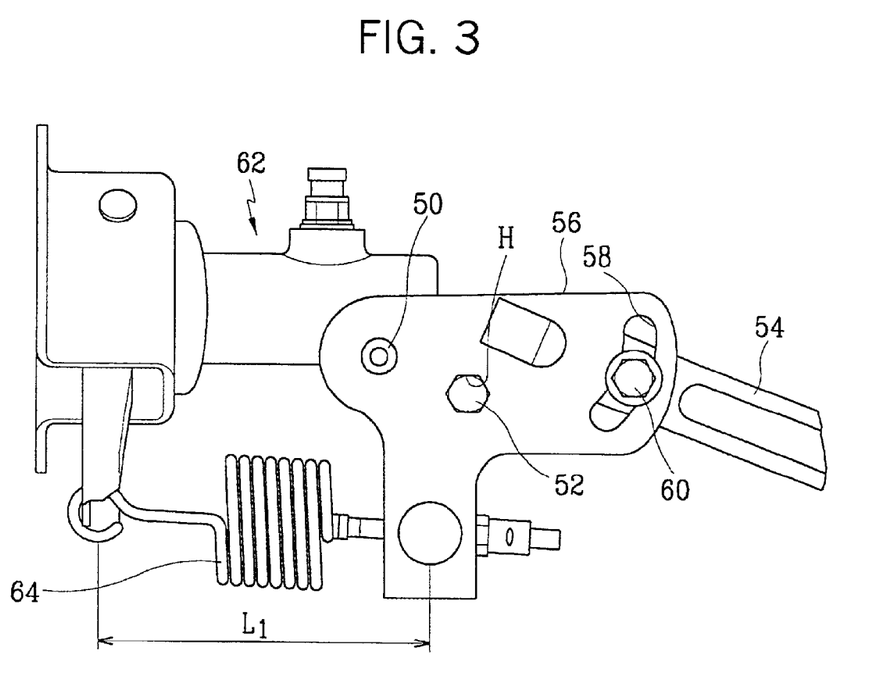
FIG. 3 is a side view of the load sensing proportioning valve assembly.
Figure 4:
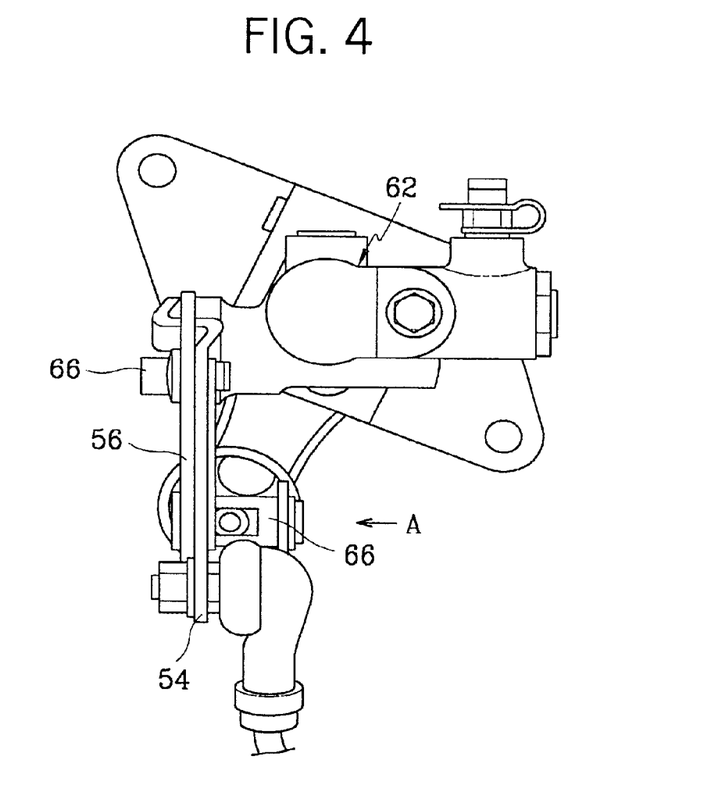
FIG. 4 is a front view of the load sensing proportioning valve assembly.
Figure 5:
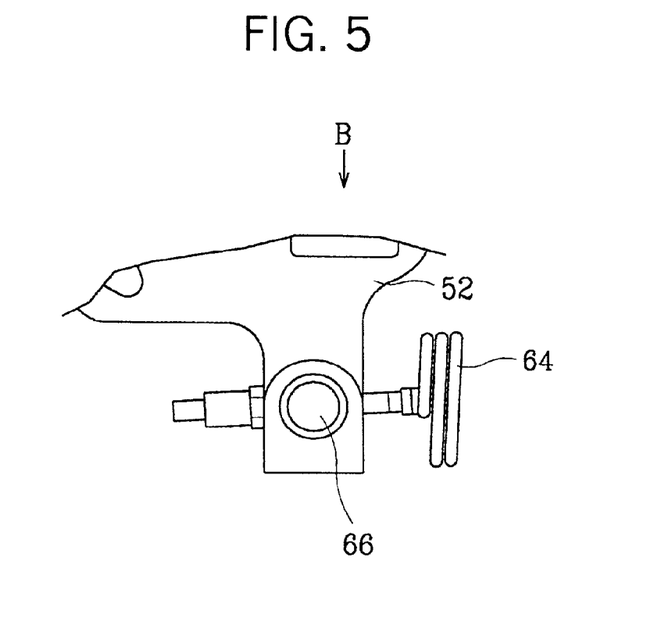
FIG. 5 is a view showing the load sensing proportioning valve assembly of FIG. 4 seen in "A" direction.
Figure 6:
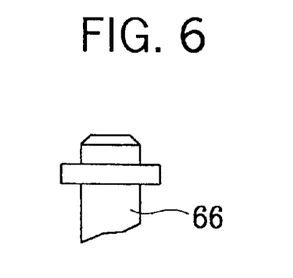
FIG. 6 is a view showing the load sensing proportioning valve assembly of FIG. 5 seen in a "B" direction.

FIG. 1 is a flowchart of a method for mounting a load sensing proportioning valve assembly in accordance with the present invention. FIG. 2 is a perspective view of a load sensing proportioning valve assembly in accordance with a preferred embodiment of the present invention. FIG. 3 is a side view of the load sensing proportioning valve assembly. FIG. 4 is a front view of the load sensing proportioning valve assembly. FIG. 5 is a view showing the load sensing proportioning valve assembly of FIG. 4 seen in "A" direction. FIG. 6 is a view showing the load sensing proportioning valve assembly of FIG. 5 seen in a "B" direction.

The method for mounting a load sensing proportioning valve assembly may be divided into three steps; a fixation step 42, a connection step 44, and a finishing step 46.

The fixation step 42 is to secure the crank member 56 of the valve assembly to a side of a rotating shaft 50, which rotatably attaches the crank member 56 to the proportioning valve 62 of the valve assembly, using a first connecting member 52 having a first rotating direction.

The connection step 44 is to connect a rod 54, which is connected to the rear axle housing of the automobile, to the crank member 60 through a slit 58 in the crank member 56 using a second connecting member 60 having a second rotating direction.

The finishing step 46 is to remove the first connecting member 52 so as to allow the crank member 56 to be rotated after the rod 54 is connected to the crank member 56.

The first connecting member 52 used for the fixation step 42 is preferably a left-handed bolt.

Two bolt holes H are formed in the crank member 56 and the proportioning valve 62 so as to accommodate the first connecting member 52, respectively.

The reason why the left-handed bolt is employed as the first connecting member 52 is that the left-handed bolt acts opposite to the action of the elastic member 64 when the first connecting member 52 is removed after the completion of the mounting of the load sensing proportioning valve assembly so as not to affect the normal length L1 of the elastic member 64.

The second connecting member 60 is preferably a right-handed bolt, and is used to connect the rod 54 to the crank member 56 that is fixed to the proportioning valve 62 by means of the first connecting member 52.

In accordance with the present invention, the crank member 56, which is rotatably attached to the proportioning valve 62 by means of the rotating shaft 50, is secured to the proportioning valve 62 using the first connecting member 52, or the left-handed bolt.

The rod 54 connected to the rear axle housing of the automobile is connected to the crank member 56 without a variation in the normal length L1 of the elastic member 64 by passing the second connecting member 60, or the right-handed bolt through both the slit 58 in the crank member 56 and the rod 54.

That is, since the crank member 56 is secured to the proportioning valve 62 by means of the first connecting member 52, or the left-handed bolt, the normal length L1 of the elastic member 64 can be maintained securely. In this state, the connection step 44 of connecting the rod 54 to the crank member 56 can be performed with a variation in the normal length L1 of the elastic member 64. The finishing step 46 is completed by removing the first connecting member 52, or the left-handed bolt, thereby completing the entire mounting procedure.

The reason why the left-handed bolt is used as the first connecting member 52 is that the crank member 56 to which the rod 54 is connected is rotated counterclockwise.

Accordingly, there is employed the left-handed bolt that can be removed by clockwise rotation and does not affect the operation of the crank member 56, so that a variation in the normal length L1 of the elastic member 64 is prevented and imbalanced braking due to inferior mounting is prevented, thus stabilizing a braking operation.

In addition, as indicated in FIGS. 4, 5 and 6, a mounting bracket, a mounting pin, a bolt and a band that are employed for a conventional method for mounting the load sensing proportioning valve assembly can be eliminated.

As described above, the present invention provides a method for mounting a load sensing proportioning valve assemble of an automobile, which is capable of balancing the braking operation of the automobile by prevention the variation of the normal length of its elastic member, and simplifying the mounting procedure of the assembly and reducing the mounting cost of the assembly by reducing the number of parts used for the mounting of the assembly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for mounting a load sensing proportioning valve assembly of an automobile, comprising the step of:

securing a crank member of the assembly to a side of a rotating shaft, which rotatably attaches the crank member to the load sensing proportioning valve assembly, using a first connecting member having a first rotating direction;

connecting a rod, which is connected to a rear axle housing of the automobile, to the crank member through a slit formed in the crank member using a second connecting member having a second rotating direction; and removing the first connecting member so as to allow the crank member to be rotated.

2. The method according to claim 1, wherein said first connecting member is a left-handed bolt.

3. The method according to claim 1, wherein said second connecting member is a right-handed bolt.

4. The method according to claim 1, wherein said first connecting member is provided with a bolt hole through which the first connecting member is fastened.

* * * * *